UNITED STATES PATENT OFFICE.

CHARLES SCHAFFER, OF WASHINGTON, DISTRICT OF COLUMBIA, ASSIGNOR TO GEORGE W. COOK, OF SAME PLACE.

IMPROVEMENT IN COMPOUNDS FOR ARTIFICIAL STONE.

Specification forming part of Letters Patent No. 188,679, dated March 20, 1877; application filed March 7, 1877.

*To all whom it may concern:*

Be it known that I, CHARLES SCHAFFER, of Washington, in the county of Washington, and in the District of Columbia, have invented certain new and useful Improvements in Manufacture of Artificial Stone; and do hereby declare that the following is a full, clear, and exact description thereof.

The nature of my invention consists in making an artificial stone, in the manner hereinafter described.

To enable those skilled in the art to make and use my invention, I will proceed to describe its construction and use.

I first take one part of Portland cement and one part of fine sand. I mix these thoroughly together and then sift them. To these ingredients I add two parts of crushed marble or stone of any color, or of mixed colors.

I then make a solution composed of salicylic acid, one part to three hundred parts of water, and add sufficient zinc white to make the mass of about the consistency of molasses.

When this has been done I mix all of the ingredients together thoroughly, and mold in any shape desired. After set and dried I place the blocks in a kiln or room having a temperature of 60° to 65° Fahrenheit for from two to three days.

The blocks are then ready for grinding and polishing.

Tiles and blocks formed in this manner are susceptible of a very high degree of polish, and are as durable, or more so, than natural stone and marble.

Having thus fully described my invention, what I claim as new, and desire to secure by Letters Patent, is—

An artificial stone, composed of Portland cement, sand, crushed marble or stone, salicylic acid, water, and zinc white, compounded substantially in the proportions, and treated as herein specified.

In testimony that I claim the foregoing I have hereunto set my hand this 23d day of February, 1877.

CHARLES SCHAFFER.

Witnesses:
 FRANK GALT,
 HENRY N. MILLER.